United States Patent [19]

Shaw et al.

[11] Patent Number: 4,784,453
[45] Date of Patent: Nov. 15, 1988

[54] BACKWARD-FLOW LADDER ARCHITECTURE AND METHOD

[75] Inventors: H. John Shaw; Behzad M. R. Moslehi, both of Stanford, Calif.

[73] Assignee: Litton Systems, Inc., Beverly Hills, Calif.

[21] Appl. No.: 9,848

[22] Filed: Feb. 2, 1987

[51] Int. Cl.⁴ .............................................. G02B 6/28
[52] U.S. Cl. ............................. 350/96.16; 350/96.15; 455/612
[58] Field of Search ............... 350/96.15, 96.16, 96.29; 455/610, 612

[56] References Cited

U.S. PATENT DOCUMENTS

| | | | |
|---|---|---|---|
| 3,645,603 | 2/1972 | Smith | 350/149 |
| 3,990,036 | 11/1976 | Savit | 340/15.5 TS |
| 4,166,946 | 9/1979 | Chown et al. | 250/199 |
| 4,294,513 | 10/1981 | Nelson et al. | 350/96.29 |
| 4,301,543 | 11/1981 | Palmer | 455/612 |
| 4,307,933 | 12/1981 | Palmer et al. | 350/96.16 |
| 4,307,937 | 12/1981 | Gordon | 350/96.29 |
| 4,317,614 | 3/1982 | Palmer | 350/96.16 |
| 4,360,272 | 11/1982 | Schmadel et al. | 356/352 |
| 4,368,981 | 1/1983 | Ozeki | 356/352 |
| 4,378,143 | 3/1983 | Winzer | 350/96.15 |
| 4,443,700 | 4/1984 | Macedo et al. | 250/227 |
| 4,490,163 | 12/1984 | Jochem et al. | 65/4.21 |
| 4,493,528 | 1/1985 | Shaw et al. | 350/96.15 |
| 4,505,587 | 3/1985 | Haus et al. | 356/345 |
| 4,511,208 | 4/1985 | Ozeki et al. | 350/96.16 |
| 4,525,818 | 6/1985 | Cielo et al. | 367/149 |
| 4,530,603 | 7/1985 | Shaw et al. | 356/345 |
| 4,545,253 | 10/1985 | Avicola | 73/655 |
| 4,552,457 | 11/1985 | Giallorenzi et al. | 356/345 |
| 4,588,255 | 5/1986 | Tur et al. | 350/96.16 |
| 4,588,296 | 5/1986 | Cahill et al. | 356/350 |
| 4,606,020 | 8/1986 | Ruffin | 370/3 |
| 4,630,885 | 12/1986 | Haavisto | 350/96.15 |
| 4,632,551 | 12/1986 | Pavlath | 356/345 |
| 4,633,170 | 12/1986 | Burns | 324/77 K |
| 4,648,082 | 3/1987 | Savit | 367/149 |
| 4,648,083 | 3/1987 | Giallorenzi | 367/149 |
| 4,653,916 | 3/1987 | Henning et al. | 356/345 |
| 4,676,583 | 6/1987 | Hicks, Jr. | 350/96.15 |
| 4,676,585 | 6/1987 | Shaw et al. | 350/96.15 |
| 4,697,876 | 10/1987 | Dyott | 350/96.29 |
| 4,697,926 | 10/1987 | Youngquist et al. | 356/345 |

FOREIGN PATENT DOCUMENTS

| | | |
|---|---|---|
| 0023345 | 2/1981 | European Pat. Off. . |
| 3224775 | 1/1983 | Fed. Rep. of Germany . |
| 2473188 | 7/1981 | France . |
| 58-211119 | 12/1983 | Japan . |
| WO79/00377 | 6/1979 | PCT Int'l Appl. . |
| 8301303 | 4/1983 | PCT Int'l Appl. ............... 356/350 |
| WO83/02496 | 7/1983 | PCT Int'l Appl. . |
| WO83/03684 | 10/1983 | PCT Int'l Appl. . |
| WO85/00221 | 1/1985 | PCT Int'l Appl. . |
| 2096762 | 10/1982 | United Kingdom . |

OTHER PUBLICATIONS

Sheem et al., "Wavelength Monitoring of Single-Mode Diode Laser Using Guided-Wave Interferometer", *Optics Letters*, May 1980, vol. 5, No. 5, pp. 179–181.

Davis, "Fiber Optic Sensors: An Overview", SPIE, vol. 478, May 1984, pp. 12–18.

Pavlath et al., "Applications of All-Fiber Technology to Sensors", *Proc. SPIE*, (Int. Soc. Opt. Eng.) vol. 412, 5–7, Apr. 1983, pp. 70–79.

(List continued on next page.)

*Primary Examiner*—John Lee
*Attorney, Agent, or Firm*—John H. Lynn

[57] ABSTRACT

A ladder architecture comprises an input optical fiber bus and an output optical fiber bus. A plurality of input optical couplers couple light between the input bus and a plurality of branching fibers. A plurality of output couplers couple light from the branching fibers to the output bus. The input bus and the branch fibers may be single mode optical fibers while the output bus a multimode optical fiber. The input couplers may be symmetrical, single mode devices, and the output couplers may be asymmetrical and single mode to multimode devices. The input bus may also be a multimode fiber, and the input couplers may also be multimode to single mode devices. The asymmetrical coupling reduces the amount of signal lost at fiber ends.

16 Claims, 3 Drawing Sheets

OTHER PUBLICATIONS

Dandridge et al., "Phase Compensation in Interferometric Fiber Optic Sensors", *Optics Letters*, vol. 7, No. 6, Jun. 1982, pp. 279–281.

Nelson et al., "Passive Multiplexing System for Fiber-Optic Sensors", *Applied Optics*, vol. 19, No. 17, 9/1980, pp. 2917–2920.

Kersey et al., "Demodulation Scheme Fibre Interferometric Sensors Employing Laser Frequency Switching", *Electronics Lett.* vol. 19, No. 3, pp. 102–103 (2/3/83).

Nelson et al., "Passive Multiplexing Techniques for Fiber Optic Sensor Systems", I.F.O.C., 3/1981, pp. 27–30.

Bergh et al., "Single Mode Fibre Optic Directional Coupler", Mar. 27, 1980, *Electronics Lett.*, vol. 16, No. 7, pp. 260–261.

Brooks et al., "Coherence Multiplexing of Fiber-Optic Interferometric Sensors", Journal of Lightwave Technology, vol. LT-3, No. 5, Oct. 1985, pp. 1062–1071.

Digonnet et al., "Analysis of a Tunable Single Mode Optical Fiber Coupler", *IEEE Journal of Quantum Electronics* vol. QE-18, No. 4, Apr. 1982, pp. 746–754.

Jackson et al., "Optical Fiber Delay-Line Signal Processing", *IEEE Transactions on Microwave Theory and Techniques*, vol. MTT-33, No. 3, Mar. 1985, pp. 193–210.

Tur et al., "Fiber-Optic Signal Processor with Applications to Matrix-Vector Multiplication and Lattice Filtering", *Optics Letters*, vol. 7, No. 9, Sep. 82, pp. 463–465.

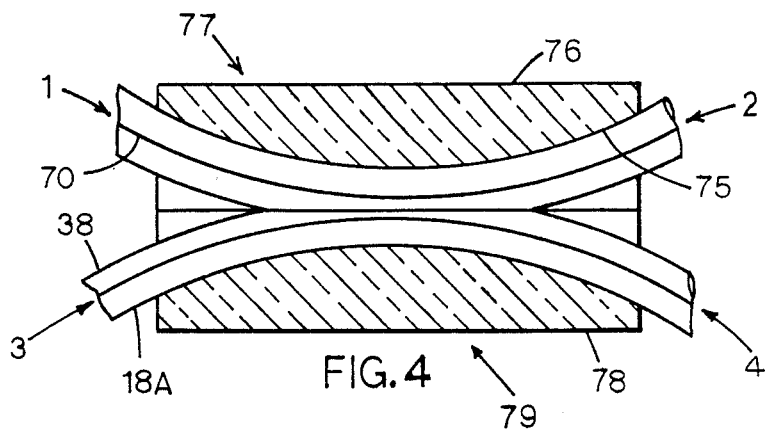
FIG. 4
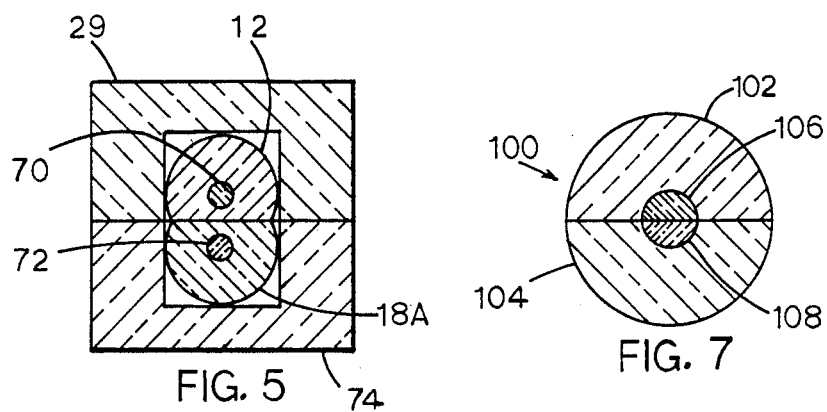
FIG. 5
FIG. 7
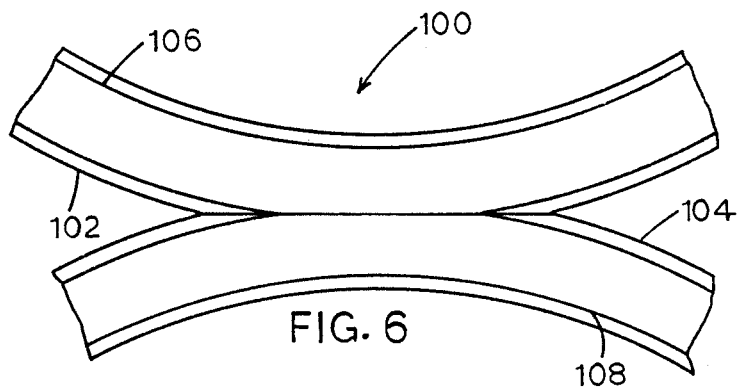
FIG. 6

BACKWARD-FLOW LADDER ARCHITECTURE AND METHOD

BACKGROUND OF THE INVENTION

This invention relates to optical fiber signal processors and more particularly to a ladder architecture for use in time and frequency domain signal processing applications such as filtering, matrix algebra operations, etc. The ladder architecture also relates to fiber optic sensors.

An optical fiber comprises a central core and a surrounding cladding. The refractive index of the core is greater than that of the cladding, and the diameter of the core is so small that light guided by the core impinges upon the core-cladding interface at an angle less than the critical angle for total internal reflection.

A light wave may be represented by a time-varying electromagnetic field comprising orthogonal electric and magnetic field vectors having a frequency equal to the frequency of the light wave. An electromagnetic wave propagating through a guiding structure can be described by a set of normal modes. The normal modes are the permissible distributions of the electric and magnetic fields within the guiding structure, for example, a fiber optic waveguide. The field distributions are directly related to the distribution of energy within the structure. The normal modes are generally represented by mathematical functions that describe the field components in the wave in terms of the frequency and spatial distribution in the guiding structure. The specific functions that describe the normal modes of a waveguide depend upon the geometry of the waveguide. For an optical fiber, where the guided wave is confined to a structure having a circular cross section of fixed dimensions, only fields having certain frequencies and spatial distributions will propagate without severe attenuation. The waves having field components that propagate unattenuated are the normal modes. A single mode fiber will propagate only one spatial distribution of energy, that is, one normal mode, for a signal of a given frequency.

A multimode fiber will propagate more than one normal mode of a given frequency. The number of guided modes in an optical fiber depends upon the diameter of the core.

Optical fibers are useful in signal processing systems because they provide greater rates of information transfer than are possible with wires carrying electrical signals. The speed of light in an optical fiber is greater than the speed of electrical signals in a conductor. Light signals in optical fibers also have the advantage of providing more communications channels than lower frequency electromagnetic waves.

Previous optical fiber architectures have been included as elements of sensor arrays. These prior architectures have employed symmetrical couplers and all single-mode optical fibers or all multimode optical fibers and symmetrical multimode couplers. See, for example, J. L. Brooks, Jr. et al., "Coherence Multiplexing of Fiber-Optic Interferometric Sensors," Lightwave Technology, Vol. LT-3, No. 5, pp. 1062–1072, Oct. 1985; A. R. Nelson, et al., "Passive Multiplexing System for Fiber-Optic Sensors," Applied Optics, V-19, N-17, pp. 2917–2920, Sept. 1980.

A systolic system includes a set of interconnected cells that are each capable of performing some simple operation. In a systolic system, the data flow is in a pipelined fashion. The data passes through many processing elements before leaving the system. Pipelining permits processing to proceed concurrently with input and output, thereby minimizing overall execution time. Systolic systems thus provide the advantages of effective use of data with high computation throughput, simple and regular data flows, use of simple and uniform cells and modular expandability.

Fiber optic architectures have been employed in fiber optic systolic matrix-vector multipliers. These architectures have employed recirculating loops, therefore, considerable time was required for recirculations or echoes from one input pulse sequence to die out before another input pulse sequence could be launched. See, for example, U.S. Pat. No. 4,588,255 "Fiber Optic Signal Processor for Matrix Vector Multiplication and Lattice Filtering" by Tur, Goodman, Moslehi, Bowers and Shaw. The disclosure of that patent is incorporated by reference into this disclosure. These recirculations limit the average duty cycle or total data throughput of a system.

Ladder structure may be used to eliminate the recirculation, but such structures lose a considerable portion of input light from the system due to the existence of free fiber ends at the output couplers. The loss of light reduces the amount of light that may be coupled to the output end of the output fiber.

Optical fibers can be made sensitive to a large number of physical phenomena, such as acoustic waves and temperature fluctuations. An optical fiber exposed to such phenomena changes the amplitude, phase or polarization of light guide by the fiber. Optical fibers have been used as sensing elements in microphones, hydrophones, magnetometers, accelerometers and electric current sensors.

Mach-Zehnder, Michelson, Sagnac, and resonant ring interferometers have been used as sensors. Mach-Zehnder, Michelson and Sagnac interferometers respond to the phenomenon being sensed by producing phase differences in interfering light waves. Detecting phase changes in the waves permits quantitative measurements to be made on the physical quantity being monitored. The Sagnac interferometer produces phase differences in two counter-propagating light waves in a coil of a single fiber in response to rotations about the axis of the coil.

A fiber optic Mach-Zehnder interferometer typically has a reference arm comprising a first length of optical fiber and a sensing arm comprising a second length of optical fiber. The sensing arm is exposed to the physical parameter to be measured, such as an acoustic wavefront, while the reference arm is isolated from changes in the parameter. When the Mach-Zehnder interferometer is used as an acoustic sensor, acoustic wavefronts change the optical length of the sensing arm as a function of the acoustic wave pressure amplitude. An optical coupler divides a light signal between the two arms. The signals are recombined after they have propagated through the reference and sensing arms, and the phase difference of the signals is monitored. Since the signals in the reference and sensing arms had a definite phase relation when they were introduced into the arms, changes in the phase difference are indicative of changes in the physical parameter to which the sensing arm was exposed.

SUMMARY OF THE INVENTION

This invention is the provision of an improved optical fiber ladder architecture having improved light collecting efficiency, having an increased average duty cycle, not requiring recirculations of input light, that is simpler and cheaper to make, having improved signal-to-noise ratio with a resultant higher accuracy, and having enhanced overall data throughput.

A fiber optic ladder array according to the invention comprises a transmit optical fiber bus; a plurality of branch optical fibers; optical coupling means connected between the transmit bus and the branch single mode optical fibers to couple optical signals from the transmit bus into each of the branch single mode optical fibers; an output optical fiber bus that includes an output end; and asymmetric optical coupling means for coupling light into the optical fiber output bus to reduce the amount of optical signal intensity lost when output signals propagate in the output optical fiber bus toward the output end.

The optical fiber transmit bus, and the branch optical fibers in the fiber optic ladder array according to the invention may be formed of single mode optical fibers, and the optical fiber output bus may comprise a multi-mode optical fiber. The fiber optic ladder array according to the invention may also include a plurality of symmetrical optical couplers for coupling light between the transmit optical fiber bus and each of the branch optical fibers.

The asymmetrical coupling means in the fiber optic ladder array according to the invention may comprise a plurality of asymmetrical optical couplers for coupling light between each of the branch fibers and the output optical fiber bus. Each asymmetrical optical coupler may be formed to have a greater coupling efficiency for coupling light from the branch fibers into the optical fiber output bus than for coupling light from the optical fiber output bus into the branch fibers.

The optical fiber transmit bus and each branch optical fiber in the fiber optic ladder array according to the invention may comprise a single mode optical fiber, while the optical fiber output bus comprises a multimode optical fiber. The optical coupling means connected between the transmit optical fiber bus and the branch single mode optical fibers may comprise a plurality of asymmetrical optical couplers for coupling light between the transmit optical fiber bus and each of the branch optical fibers. The fiber optic ladder array according to the present invention may also comprise a plurality of asymmetrical optical couplers for coupling light between each of the branch fibers and the output optical fiber bus, each asymmetrical optical coupler being formed to have a greater coupling efficiency for coupling light from the branch fibers into the optical fiber output bus than for coupling light from the optical fiber output bus into the branch fibers.

The method of the invention for forming fiber optic ladder array comprises the steps of forming a transmit optical fiber bus; forming a plurality of branch optical fibers; coupling optical signals between the transmit bus and the branch optical fibers; forming an output optical fiber bus; and asymmetrically coupling optical coupling light into the optical fiber output bus to reduce the amount of optical signal intensity lost when output signals propagate in the output optical fiber bus.

The method of the invention may further include the steps of forming the transmit optical fiber bus to comprise a single mode optical fiber; forming each branch optical fiber to comprise a single mode optical fiber; and forming the output optical fiber output bus to comprise a multimode optical fiber. The method may further include step of forming the optical coupling means connected between the transmit optical fiber bus and the branch single mode optical fibers to comprise a plurality of symmetrical optical couplers for coupling light between the transmit optical fiber bus and each of the branch optical fibers.

The method of this invention may also further include the steps of forming the asymmetrical coupling means to comprise a plurality of asymmetrical optical couplers for coupling light between each of the branch fibers and the output optical fiber bus; and forming each asymmetrical optical coupler to have a greater coupling efficiency for coupling light from the branch fibers into the optical fiber output bus than for coupling light from the optical fiber output bus into the branch fibers.

The method of the invention may further include the steps of forming the optical coupling means connected between the transmit optical fiber bus and the branch optical fibers to comprise a plurality of symmetrical optical couplers for coupling light between the transmit optical fiber bus and each of the branch optical fibers; forming the asymmetrical coupling means to comprise a plurality of asymmetrical optical couplers for coupling light between each of the branch fibers and the output optical fiber bus; and forming each asymmetrical optical coupler to have a greater coupling efficiency for coupling light from the branch fiber into the optical fiber output bus than for coupling light from the optical fiber output bus into the branch fibers.

The method may further include the steps of forming the optical fiber transmit bus to comprise a multimode optical fiber; forming each branch optical fiber to comprise a single mode optical fiber; and forming the output optical fiber bus to comprise a multimode optical fiber. The method may also include the steps of forming the asymmetrical coupling means to comprise a plurality of asymmetrical optical couplers for coupling light between each of the branch fibers and the output optical fiber bus; and forming each asymmetrical optical coupler to have a greater coupling efficiency for coupling light from the branch fibers into the output optical fiber output bus than for coupling light from the output optical fiber bus into the branch fibers.

The method may further include the steps of coupling light between each of the branch fibers and the output optical fiber bus with a plurality of asymmetrical optical couplers; and forming each asymmetrical optical coupler to have a greater coupling efficiency for coupling light from the branch fibers into the output optical fiber bus than for coupling light from the output optical fiber bus into the branch fibers.

BRIEF DESCRIPTION OF THE DRAWINGS

FIG. 4 illustrates a symmetrical coupler for coupling light between two single mode fibers;

FIG. 5 is a cross sectional view of the coupler of FIG. 4;

FIG. 6 illustrates a symmetrical coupler for coupling light between two multimode optical fibers;

FIG. 7 is a cross sectional view of the coupler FIG. 6;

DESCRIPTION OF THE PREFERRED EMBODIMENT

Figure 1:
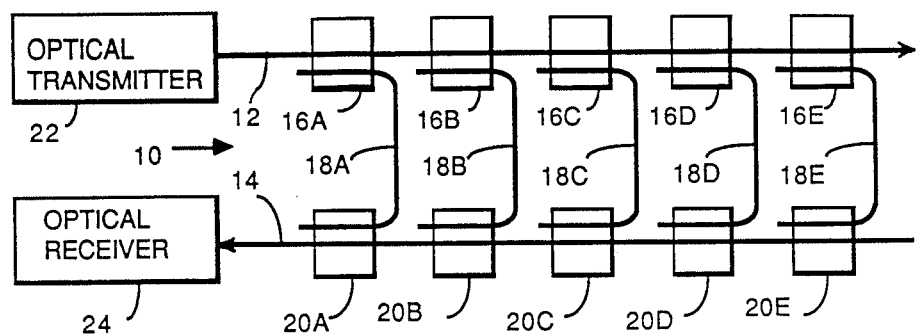
FIG. 1 is a schematic illustration of a ladder architecture according to the invention.

Referring to FIG. 1, a ladder architecture 10 in accordance with the present invention comprises an input optical fiber bus 12 and an output optical fiber bus 14. A first plurality of optical couplers 16A, 16B, etc. couple light between the input bus 12 and a plurality of branching fibers 18A, 18B, etc. A second plurality of couplers 20A, 20B, etc. couple light from the branching fibers 18A, 18B, etc. to the output bus 14. An optical transmitter 22 supplies input optical signals to the input bus 12, and an optical receiver 24 receives the optical signals guided by the output bus 14. The couplers 20A, 20B, etc., are formed so that light coupled into the return bus propagates to the left back in the general direction of the transmitter, hence the name feedbackward ladder architecture.

In a preferred embodiment of the invention shown in FIG. 1, the input bus 12 is a single mode optical fiber, the branches 18A, 18B, etc. are single mode optical fibers, the output bus 14 is a multimode optical fiber, the input couplers 16A, 16B, etc. are symmetrical single-mode devices, and the output couplers 20A, 20B, etc. are asymmetrical single-mode-to-multimode devices. The couplers 16A, 16B, etc. and 20A, 20B, etc. preferably have adjustable coupling ratios. Alternatively they may have fixed coupling ratios. The coupling ratios of the couplers are selected for the particular application for which the ladder structure is to be used.

Symmetrical couplers cross couple the same percent of light for signals incident on either of the input ports on the same side of the coupler. Asymmetrical single-to-multimode couplers couple more of the light from the single mode fiber to the multimode fiber than from the multimode optical fiber to the single-mode optical fiber. As a result, much less light is lost at the free or open end of the branch fibers 18A, 18B, etc. than with symmetrical couplers. The result is that this ladder structure has increased efficiency in coupling light to the output end of the output bus 14. In most applications of ladder arrays, the object is for the output bus 14 to collect the maximum possible amount of light and guide this light to the receiver 24. Also, when this structure is used as a systolic multiplier it does not have the problem of echoes or circulating pulses in the fibers. This allows the device to operate at a higher duty cycle with a resultant higher throughput of data.

All of the asymmetrical couplers in the ladder array 10 may be formed to have substantially identical structures. Therefore, only the structure of the coupler 20A is described herein. This structure is also described in U.S. patent application Ser. No. 744,502, filed June 13, 1985. The disclosure of that application is incorporated by reference into this disclosure.

Figures 2, 3:
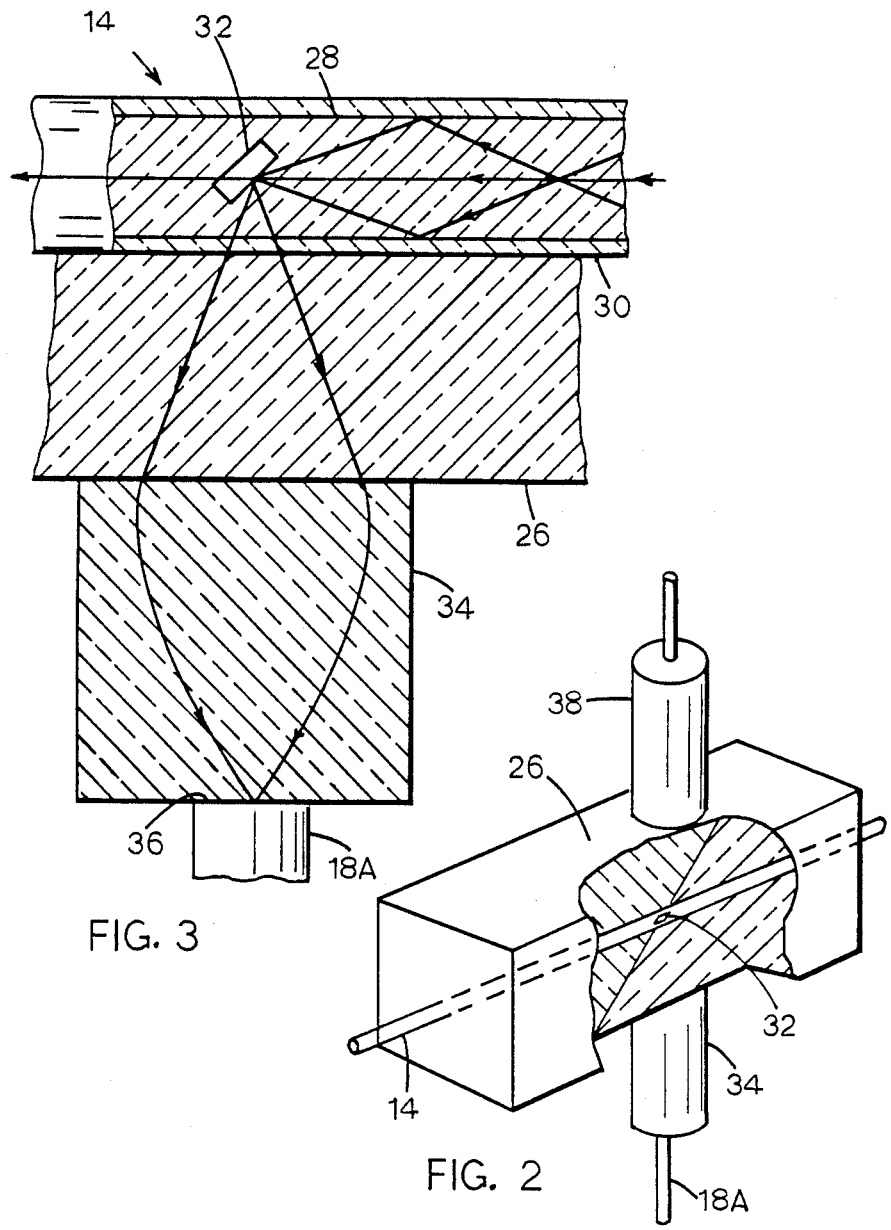
FIG. 2 is a perspective view of an asymmetrical fiber optic directional coupler that may be included in a sensor array according to the invention.
FIG. 3 is a cross sectional view of the asymmetrical fiber optic directional coupler of FIG. 2.

FIGS. 2 and 3 show the multimode fiber 14 retained within a block 26 that may be formed of quartz. The multimode fiber 14 has a core 28 and a cladding 30. A reflector 32 is positioned on the central axis of the multimode fiber 14. The reflector 32 is oriented to reflect incident light so that it is nearly normal to the core/cladding interface. The reflected light therefore propagates out of the multimode fiber 14. The reflector 32 is very small so that only a small fraction of the light in the multimode fiber impinges upon it. Therefore, only a small fraction of the light in the multimode fiber 14 is removed therefrom by the reflector 32.

Still referring to FIG. 2 and 3, the reflected light is directed toward a lens 34 that gathers the light removed from the multimode fiber 14 and focuses it upon an end 36 of the single mode fiber 18A. Therefore, the light removed from the multimode fiber 14 is coupled into the single mode fiber 18A. This light is then lost from the array 10 of FIG. 1.

A lens 38 focuses light guided by the single mode fiber 18A toward the multimode fiber 14 onto the reflector 32. The reflector 32 receives a large portion of the light in the single mode fiber 18A. The reflector 32 is arranged to reflect light into a generally cone-shaped beam directed longitudinally along the axis of the multimode fiber 14. The cone-shaped beam preferably diverges so that all of the modes within its acceptance cone are excited. The modes may be equally excited by selecting the numerical aperture of the multimode fiber 14 such that only the portion of the reflected beam having a relatively uniform intensity is within the acceptance cone. The coupling is then greater for light going from the single mode fiber 18A to the multimode fiber 14 than for light going from the multimode fiber 14 into the single mode fiber 18A.

The optical transmitter 22 may supply either periodically or aperiodically trains of optical pulses to the input optical fiber bus 12. These pulses preferably occur in a train at a prescribed rate and duty cycle. The output of the second branch fiber 18B to the fiber 14 propagates to the coupler 20A where most of the signal remains in the output bus 14 and is guided to the receiver 24. However, part of the signal is coupled into the branch fiber 18A and then leaves the array 10 through the unused end of the branch fiber 18A. Similarly, the signals from the other branches in the array 10 couple into all the preceding branch fibers. The asymmetric coupling constants of the output couplers 20A, 20B, etc. reduce the amount of signal cross coupled into the branch fibers from the output bus 14.

The asymmetric coupler provides greater attenuation of the unwanted cross coupled signals than would be possible with symmetric couplers. The asymmetric nature of the coupling causes the fraction of the output signals cross coupled from the output bus 14 back into the branch fibers 18A, 18B, etc. to be less than the portions of the input signal that are cross coupled from the branch fibers 18A, 18B, etc. into the output fiber 14.

In operation of the single mode fiber to the multimode fiber coupler 20A it is assumed that all the modes (N in number) of the multimode fiber 14 are equally excited and that intensity coupling ratios for the individual modes of the multimode fiber to the single-mode fiber (and vice versa) are the same as and equal to a constant K. With this assumption, a fraction K of each for each unit of guided light power in the single-mode fiber couples to each mode of the multimode fiber. Thus, the intensity coupling ratio from the single-mode fiber to the multimode fiber is $$K + K + \ldots + K = NK \tag{1}$$

In contrast, when one unit of light power is propagating in the multimode fiber, each mode carries 1/N unit of power with a fraction K of it coupled into the single-mode fiber. Thus, the total intensity coupling ratio from the multimode fiber to the single-mode is $$1/N \times K + 1/N \times K + \ldots + 1/N \times K = K \qquad (2)$$

The coupling ratio from the single-mode fiber to the multimode fiber is N times that from the multimode fiber to the single-mode fiber.

Therefore, in contrast to standard symmetric couplers, the single mode fiber to multimode fiber coupler is a nonreciprocal (asymmetric) coupler. This property provides for enhancing the performance of fiber signal processors.

These couplers preferably have adjustable couling ratios, but fixed ratios may be used in some applications. The coupling ratios of various ones of the couplers 20A, 20B, etc., are selected for the particular application for which the lattice structure is used.

In signal processing applications, the coupling ratios may be different. For example, the array may be used for multiplying matrices. The operation of the lattice as a systolic multiplier is described by M. Tur, et al, "Fiber-Optic Signal Processing with Applications to Matrix-Vector Multiplication and Lattice Filtering," Optic Letters, V-7, N-9, pp. 463-465, September 1982 and B. Moslehi, et al., "Fiber-Optic Lattice Signal Processing," IEEE Proceedings Vol. 72, No. 7, pp. 909-930 (1984). Both of these two documents are incorporated by reference into this disclosure.

The array 10 is easier to adjust than conventional ladder structures since the coupling ratio adjustments are less interdependent. This is because the major portion of light traveling in the single-mode fiber 18A is coupled into the multimode fiber 14, whereas only a small amount of light traveling in the multimode fiber 14 is coupled back into the single-mode fiber 18A. These coupling characteristics provide an increase in the average duty cycle and overall efficiency of the device.

Symmetrical single-mode and symmetrical multimode couplers are well known in the art. See, for example, R. A. Bergh, G. Kotler, and H. J. Shaw, "Single-mode Fiber Optic Directional Coupler," Electronics Lett. 16, 260-261 (1980) and M. J. F. Digonnet and H. J. Shaw, "Analysis of a Tunable Single-Mode Fiber Coupler," IEEE J. Quantum Electronics, QE-18, 746-754 (1982). U.S. Pat. No. 4,493,528 issued Jan. 15, 1985 to Shaw et al. and assigned to the Board of Trustees of the Leland Stanford Junior University also discloses a symmetrical fiber optic directional coupler suitable for use in this invention. The disclosure of that patent is incorporated into this disclosure.

All of the symmetrical single mode couplers included in the array 10 may have substantially identical structures. Therefore only the coupler 16A is described in detail.

Referring to FIGS. 4 and 5, optical power can be coupled between two optical fibers 12 and 18A by the evanescent fields that extend outside the fiber cores. This effect has been used to make integrated-optic couplers where the dielectric waveguides can be fabricated in close enough proximity for evanescent coupling. The fiber 12 has a core 68 and a cladding 70, and the fiber 18A has a core 72 and a cladding 74. With optical fibers the evanescent field is buried deep within the fiber cladding to achieve low loss. Therefore, some cladding 70 and 74 must be removed to expose the evanescent field of the guiding fiber cores 68 and 72, respectively. The couplers used in the present invention may be formed by using a mechanical lapping technique to expose the evanescent fields.

Referring to FIGS. 4 and 5, the optical fiber 12 is bonded into a curved slot 75 in a quartz block 76. The block 76 and fiber cladding 70 are then ground and polished to within a few microns of the fiber core 68. The polished block 76 and fiber 12 comprise a coupler half 77. A similarly ground and polished block 78 and fiber 18A comprise a coupler half 79. Placing the two coupler halves 77 and 79 in contact so that the polished faces confront each other places the cores 68 and 72 in close proximity. An index-matching oil is then inserted by a capillary action between the polished coupler halves 77 and 79 to match the cladding index to the refractive index of the block. This oil also acts as a lubricant to allow one coupler half to be slid over the other to change the core-to-core separation and the net coupling.

Referring to FIGS. 4 and 5, consider light traveling from ports 1 and 3, interacting in the coupling region, and exiting from ports 2 and 4. The input electric fields in fibers 12 and 18A can be expressed as $$E_i(x,y,z,t) = (\tfrac{1}{2})E_i(z)a(x,y)e^{j(\beta z - \omega t)} + c.c., i=1,2 \qquad (3)$$

where $E_i(z)$ is the complex field amplitude, $\omega$ is the optical frequency, $\beta$ is the fiber propagation constant, and c.c. is the complex conjugate. E(z) changes with z only in the coupling region. The vector a(x,z) is the modal field distribution normalized to unity so that $$\iint_{-\infty}^{+\infty} a(x,y)a^*(x,y)dxdy = 1 \qquad (4)$$

In general, for a single-mode fiber there are two possible orthogonal field distributions, a and b, representing two orthogonal states of polarization, where $$\iint_{-\infty}^{+\infty} a(x,y)b^*(x,y)dxdy = 0 \qquad (5)$$

This analysis always assumes that only one polarization mode is present and does not consider the field distribution any further. More generally, if the directional coupler is polarization independent, any well defined input state of polarization (expressed as a linear combination of a and b) can be thought of as a single "polarization mode." Again, the field distribution need not be considered.

When the fiber guides are evanescently coupled, the z dependence of the complex fields in the optical fibers 12 and 18A follows standard coupled-mode relations:

$$dE_1(z)/dz = jkE_2(z) \qquad (6)$$

$$dE_2(z)/dz = jkE_1(z). \qquad (7)$$

A constant coupling coefficient per unit length K is assumed. The two fiber guides are considered to be identical, and therefore have identical propagation constants $\beta$. If the coupling starts at z=0 with the initial amplitudes of $E_1(0)$ and $E_2(0)$ in fibers 12 and 18A, respectively, then for a lossless coupler $$d/dz(|E_1(z)|^2+|E_2(z)|^2)=0 \quad (8)$$

Under these conditions the solutions to Equations (6) and (7) are $$E_1(z)=E_1(0) \cos kz + jE_2(0) \sin kz \quad (9)$$

$$E_2(z)=jE_1(0) \sin kz + E_2(0) \cos kz \quad (10)$$

In the directional coupler described above, the coupling is not constant over the interaction region due to the curving of the fibers 12 and 18A. The coupling coefficient is a function of z with a maximum value of $k_o$ where the fibers are closest. This coupler can be considered as having an effective coupling length $L_c$ with a constant coupling coefficient $k_o$ given by $$k_o L_c = \int_{-\infty}^{+\infty} k(z)dz \quad (11)$$

Therefore, after the coupled-mode interaction, the complex field amplitudes in the two fibers are $$E_1(L_c)=E_1(0) \cos k_o L_c + jE_2(0) \sin k_o L_c \quad (12)$$

$$E_2(L_c)=jE_1(0) \sin k_o L_c + E_2(0) \cos k_o L_c \quad (13)$$

In many applications, the parameter of interest is the total coupled power. Let $\sin k_o L_c = \kappa^{\frac{1}{2}}$ and thus $\cos k_o L_c = (1-\kappa)^{\frac{1}{2}}$. Further, the amplitudes $E_1(0)$ and $E_3(0)$ can be regarded as the field amplitudes at two input ports, 1 and 3 while the amplitudes $E_2(L_c)$ and $E_4(L_c)$ can be the field amplitudes at the two output ports 2 and 4. Defining $E_1 \equiv E_1(0)$, $E_3 \equiv E_3(0)$, $E_2 \equiv E_1(L_c)$, and $E_4 \equiv E_3(L_c)$, yields $$E_2=(1-\kappa)^{\frac{1}{2}}E_1+j\kappa^{\frac{1}{2}}E_3 \quad (14)$$

$$E_4=j\kappa^{\frac{1}{2}}E_1+(1-\kappa)^{\frac{1}{2}}E_3 \quad (15)$$

Consider the case where $E_3=0$, so that incident light is present only in fiber 12.

Equations (14) and (15) reduce to $$E_2=(1-k)^{\frac{1}{2}}E_1 \quad (16)$$

$$E_4=jk^{\frac{1}{2}}E_1 \quad (17)$$

When $\kappa=0$, no coupling occurs between the two fibers. With $\kappa=0.5$, $|E_2|^2=|E_4|^2$ and half the power has been coupled from the fiber 12 into the fiber 18A. When $\kappa=1$, $E_2=0$ and $|E_4|^2=|E_1|^2$ and all the power has been coupled. Therefore, $\kappa$ is the intensity coupling constant.

For the case described by Equations (13) and (14), the phase of the light in port 4 is greater than in port 2 by $\pi/2$ as indicated by the j factor in the expression for $E_4$. The complete output fields are defined as $E_2$ and $E_4$, as in Equations (14) and (15). If $E_2$ has a phase term of $e^{j(\beta z-\omega t)}$, then $E_4$ has a phase term of $e^{j(\beta z-\omega t+\pi/2)}=e^{j(\Delta z-\omega[t-\pi/(2\omega)])}$. Thus $E_4$ lags $E_2$ in time. Physically, the coupling of power from fiber 12 to fiber 18A occurs because the evanescent electric field in fiber 18A induces a linear polarization in fiber 18A at the optical frequency in phase with the evanescent electric field of fiber 12. The linear polarization in fiber 12 is the driving team in Maxwell's equations and generates an electromagnetic wave in fiber 18A that lags this polarization in time. The driving polarization and driven field in fiber 18A have the proper phase relationship for power exchange from the induced polarization to the field.

The $e^{j(\beta z-\omega t)}$ convention of Equation (1) is chosen so that an increasing fiber length produces an increasing phase and a delay in time. If the convention was chosen to be $e^{j(\omega t-\beta z)}$, the coupling equation (12) would be modified by replacing j by $-j$. Then, in Equations (13) and (14), $E_4$ would have a phase less than $E_2$ by $\pi/2$ rad, and the phase term could be written as $e^{j(\omega t-\beta z-\pi/2)}=e^{j(\omega[t-/2\omega]-\beta z)}$. Again, $E_4$ lags $E_2$ in time, which is consistent with the physical model of a driving polarization producing a power transfer.

Figure 9:
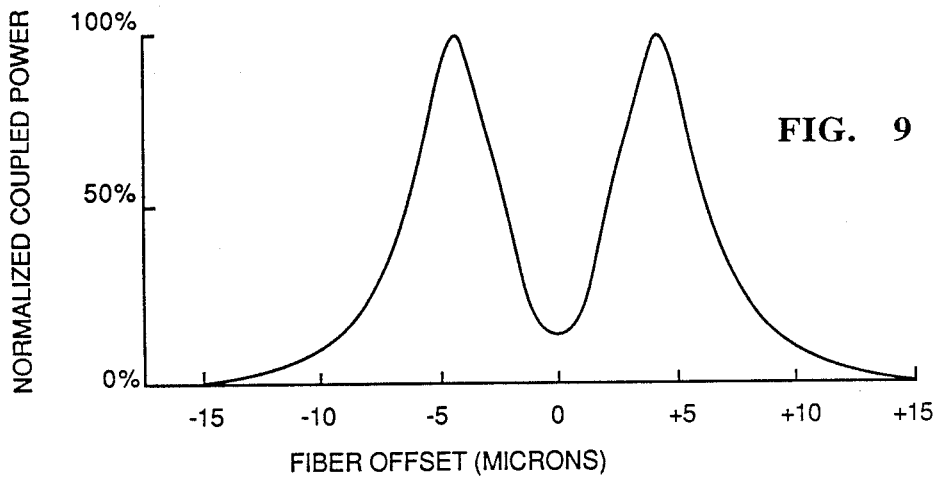
FIG. 9 graphically illustrates coupling characteristics of the coupler of FIGS. 4 and 5 as a function of core separation.

A detailed theoretical and experimental study of this type of coupler was carried out by M. J. F. Digonnet and H. J. Shaw, "Analysis of a Tunable Single-Mode Fiber-Optic Coupler", IEEE J. Quantum Electron., QE-18, 746, (1982). In particular, the intensity coupling constant $\kappa$ was theoretically determined by the coupler geometry and the ad core-to-core separation. Since the directional coupler is a true coupled-mode system formed of two identical waveguides, 100% power transfer from one fiber to the other can be achieved. FIG. 9, adapted from Digonnet and Shaw, shows the coupling for a typical coupler having power input to one fiber only. When the top block is offset far from the bottom block (e.g., 15 μm), the cores 68 and 72 are sufficiently separated so that no coulping occurs. When this offset is approximately 4 μm, 100% power transfer occurs. With less offset, power is coupled back to the original guide (overcoupling). The coupling may be easily adjusted from 0 to 100%.

The power insertion loss of these couplers is low, ranging from 2% to 10%. The directivity is high (>60 dB) and the coupling ratio, once adjusted by the offset, is nearly independent of the input state of polarization.

FIGS. 6 and 7 illustrate a symmetrical coupler 100 for coupling light between a pair of multimode fibers 102 and 104. The fibers 102 and 104 may be bonded in curved grooves in substrates (not shown) that are similar to the substrates shown in FIG. 4 for the symmetrical single mode coupler. The substrates and the fibers 102 and 104 are lapped until a predetermined amount of core material is removed. Juxtaposing the lapped cores 106 and 108 permits light to propagate from one fiber to the other in the region where the core surfaces meet.

The type of multimode coupler described above is sometimes called an intercepting core coupler. Other types of multimode fiber couplers that may be suitable for use in this invention are well-known in the art.

Referring again to FIG. 1, in a second embodiment of this invention, the input and output buses 12 and 14, respectively, are multimode optical fibers; and the branch fibers 18A, 18B, etc. are single-mode fibers. In this structure all of the couplers 16A, 16B, etc and 20A, 20B, etc. are asymmetric devices that couple light between single-mode and multimode fibers. This structure has the same advantages as the first embodiment of this invention. Another advantage is that in applications that do not require very high modulation rates, the optical source for transmitter 22 may be an inexpensive light emitting diode device that efficiently couples light into a multimode optical fiber.

Still referring to FIG. 1, in a third embodiment of the invention, the output couplers 20A, 20B, etc. may be symmetrical, although this results in a lower operational efficiency of the ladder structure.

Figure 8:
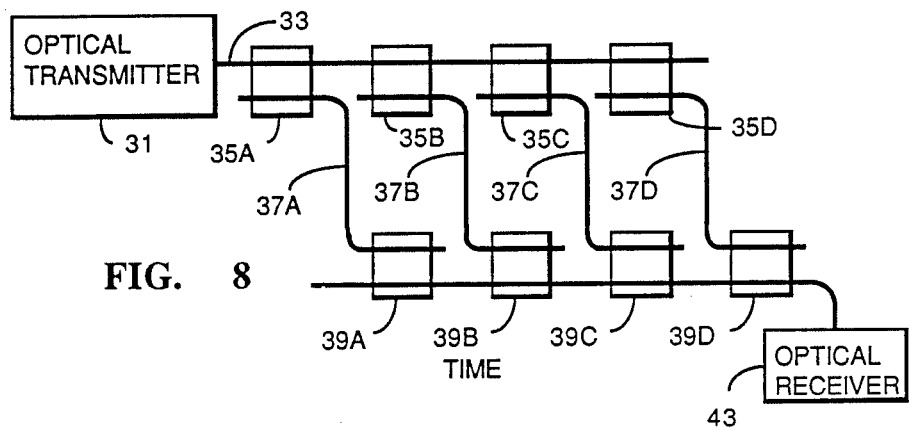
FIG. 8 schematically illustrates a second embodiment of the invention.

FIG. 8 shows a fourth embodiment of the invention, which is a forward flow version of the ladder architecture. An optical transmitter 31 provides pulses to an input bus 33. A plurality of input couplers 35A, 35B, etc. couple light from the input bus 33 into corresponding branch fibers 37A, 37B, etc., respectively. A plurality of output couplers 39A, 39B, etc. couple light from the branch fibers 37A, 37B, etc. into an output bus 41. An optical receiver 43 receives optical signals output from the output bus 41.

The input and output buses 33 and 41 may be multimode optical fibers and the branch fibers 37A, 37B, etc. may be single-mode fibers. In this structure all of the couplers 35A, 35B, etc and 35A, 35B, etc. are asymmetric devices that couple light between single-mode and multimode fibers. This structure has the same advantages as the first embodiment of this invention. Another advantage is that in applications that do not require very high modulation rates, the optical source for transmitter 31 may be an inexpensive light emitting diode device that efficiently couples light into a multimode optical fiber.

The directions of light propagation in the output buses 14 of FIG. 1 and 41 of FIG. 8 are reversed. All of the variations in fiber and coupler types mentioned above with reference to FIG. 1 can be used in the structure of FIG. 8.

The output couplers 39A, 39B, etc. may be symmetrical, although this results in a lower operational efficiency of the ladder structure.

The ladder structure in accordance with this invention may be used in systems that sense changes in a physical parameter, such as acoustic pressure. In a sensor, all the couplers may all have the same coupling ratios. In such systems the structure of the ladder 10 is such that a long length of the optical fiber 14 that is sensitized to a particular field quantity (pressure, magnetic field, electric field, etc.) is tapped periodically. An optical pulse of peak intensity $I_o$ and width $\tau$ seconds is injected into the transmit fiber 14 so that it propagates through the array 10. The pulse transits each sensor segment picking up both a static phase delay $\theta_m$ and a dynamic phase variation $\phi_m(t)$. The static phase delay arises from the time required for the pulse to propagate through the quiescent length of each sensor segment. The dynamic phase variation arises from changes in the lengths of the segments that are exposed to variations in the field being measured.

The data from each segment is returned as a phase modulation on each return optical pulse. By comparing the phases of the pulses returned from consecutive segments one can measure the dynamic phase modulation that occurred at the latter sensing segment alone. A mismatched pathlength interferometer will perform the operation.

Although the invention has been described with reference to certain preferred embodiments, the scope of the invention is not limited to the particular embodiments described. Rather, the scope and spirit of the invention are defined by the appended claims and equivalents thereof.

What is claimed is:

1. A fiber optic ladder array comprising:
a transmit optical fiber bus;
a plurality of branch single mode optical fibers;
optical coupling means connected between the transmit bus and the branch single mode optical fibers to couple optical signals from the transmit bus into each of the branch single mode optical fibers;
an output optical fiber bus that includes an output end; and
asymmetric optical coupling means for coupling light from the branch single mode optical fibers into the output optical fiber bus to reduce the amount of optical signla intensity lost when output signals propagate in the output optical fiber bus toward the output end.

2. The fiber optic ladder array in claim 1 wherein the transmit optical fiber bus comprises a single mode optical fiber and the output optical fiber bus comprises a multimode optical fiber.

3. The fiber optic ladder array of claim 2 wherein the optical coupling means connected between the transmit optical fiber bus and the branch single mode optical fibers comprises a plurality of symmetrical optical couplers for coupling light between the transmit optical fiber bus and each of the branch optical fibers.

4. The fiber optic ladder array of claim 3 wherein the asymmetrical coupling means comprises a plurality of asymmetrical optical couplers for coupling light between each of the branch fibers and the output optical fiber bus, each asymmetrical optical coupler being formed to have a greater coupling efficiency for coupling light from the branch fibers into the output optical fiber bus than for coupling light from the output optical fiber bus into the branch fibers.

5. The fiber optic ladder array of claim 1 wherein the optical coupling means connected between the transmit optical fiber bus and the branch optical fibers comprises a plurality of symmetrical optical couplers for coupling light between the transmit optical fiber bus and each of the branch optical fibers and wherein the asymmetrical coupling means comprises a plurality of asymmetrical optical couplers for coupling light between each of the branch fibers and the output optical fiber bus, each asymmetrical optical coupler being formed to have a greater coupling efficiency for coupling light from the branch fibers into the output optical fiber bus than for coupling light from the output optical fiber bus into the branch fibers.

6. The fiber optic ladder array of claim 1 wherein the transmit optical fiber bus comprises a multimode optical fiber, each branch optical fiber comprises a single mode optical fiber, and the output optical fiber bus comprises a multimode optical fiber.

7. The fiber optic ladder array of claim 6 wherein the optical coupling means connected between the transmit optical fiber bus and the branch single mode optical fibers comprises a plurality of asymmetrical optical couplers for coupling light between the transmit optical fiber bus and each of the branch optical fibers.

8. The fiber optic ladder array of claim 7 comprising a plurality of asymmetrical optical couplers for coupling light between each of the branch fibers and the output optical fiber bus, each asymmetrical optical coupler being formed to have a greater coupling efficiency for coupling light from the branch fibers into the output optical fiber bus than for coupling light from the output optical fiber bus into the branch fibers.

9. A method for forming a fiber optic ladder array, comprising the steps of:
forming a transmit optical fiber bus;
forming a plurality of branch single mode optical fibers;

coupling optical signals between the transmit bus and the branch single mode optical fibers with optical coupling means connected between the transmit optical fiber bus and the branch optical fibers;

forming an output optical fiber bus; and forming a plurality of asymmetrical optical couplers for coupling light from the branch single mode optical fibers into the output optical fiber bus to reduce the amount of optical signal intensity lost when output signals propagate in the output optical fiber bus.

10. The method of claim 9, further including the steps of:

forming the transmit optical fiber bus to comprise a single mode optical fiber; and forming the output optical fiber bus to comprise a multimode optical fiber.

11. The method of claim 10, further including the step of forming the optical coupling means connected between the transmit optical fiber bus and the branch single mode optical fibers to comprise a plurality of symmetrical optical couplers for coupling light between the transmit optical fiber bus and each of the branch optical fibers.

12. The method of claim 11, further including the step of:

forming each asymmetrical optical coupler to have a greater coupling efficiency for coupling light from the branch fibers into the output optical fiber bus than for coupling light from the output optical fiber bus into the branch fibers.

13. The method of claim 9, further including the steps of:

forming the optical coupling means connected between the transmit optical fiber bus and the branch single mode optical fibers to comprise a plurality of symmetrical optical couplers for coupling light between the transmit optical fiber bus and each of the branch single mode optical fibers; and forming each asymmetrical optical coupler to have a greater coupling efficiency for coupling light from the branch single mode fibers into the output optical fiber bus than for coupling light from the output optical fiber bus into the branch single mode fibers.

14. The method of claim 9, further including the steps of:

forming the transmit optical fiber bus to comprise a multimode optical fiber;

forming each branch optical fiber to comprise a single mode optical fiber; and forming the optical fiber output bus to comprise a multimode optical fiber.

15. The method of claim 14, further including the steps of:

forming the coupling means to comprise a plurality of asymmetrical optical couplers for coupling light between each of the branch fibers and the output optical fiber bus; and forming each asymmetrical optical coupler to have a greater coupling efficiency for coupling light from the branch fibers into the output optical fiber bus than for coupling light from the output optical fiber bus into the branch fibers.

16. The method of claim 15, further including the steps of;

coupling light between each of the branch fibers and the output optical fiber bus with a plurality of asymmetrical optical couplers; and forming each asymmetrical optical coupler to have a greater coupling efficiency for coupling light from the branch fibers into the output optical fiber bus than for coupling light from the output optical fiber bus into the branch fibers.

* * * * *